US006390917B1

(12) United States Patent
Walker et al.

(10) Patent No.: US 6,390,917 B1
(45) Date of Patent: May 21, 2002

(54) SLOT MACHINE ADVERTISING/SALES SYSTEM AND METHOD

(75) Inventors: Jay S. Walker, Ridgefield; James A. Jorasch, Stamford; Thomas M. Sparico, Riverside, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/521,869

(22) Filed: Mar. 8, 2000

Related U.S. Application Data

(63) Continuation of application No. 08/769,085, filed on Dec. 18, 1996, now Pat. No. 6,186,893.
(51) Int. Cl.[7] .................................................. A63F 9/24
(52) U.S. Cl. .......................... 463/20; 463/42; 463/25; 705/27
(58) Field of Search ............................... 463/1, 16–20, 463/11–13, 25, 29–30, 36, 40–42; 700/91, 93; 705/14, 16–18, 26–27

(56) References Cited

U.S. PATENT DOCUMENTS

| 4,745,468 A | 5/1988 | Von Kohorn |
| 4,876,592 A | 10/1989 | Von Kohorn |
| 5,022,172 A | 6/1991 | Kawahara et al. |
| 5,083,271 A | 1/1992 | Thacher et al. |
| 5,259,613 A | 11/1993 | Marnell, II |
| 5,283,734 A | 2/1994 | Von Kohorn |
| 5,429,361 A | 7/1995 | Raven et al. |
| 5,470,079 A | 11/1995 | LeStrange et al. |
| 5,488,411 A | 1/1996 | Lewis |
| 5,697,844 A | 12/1997 | Von Kohorn |
| 5,759,101 A | 6/1998 | Von Kohorn |
| 6,186,893 B1 * | 2/2001 | Walker ........................ 463/20 |

OTHER PUBLICATIONS

Poe, Juanita, "Promoters Confident TV Viewers Eager to Cry Bingo" p. 1, Chicago Tribune, May 7, 1992.
Turcsik, Richard "Recycling–Slot Machine is Tested at A&P Unit", vol. 42 No. 51, p. 17, Supermarket News, Dec. 21, 1992.
Rich, Laura, All Aboard the Brand Train, Inside Media, p. 26, Mar. 29, 1995.
Gillen, Marilyn A. "ADS Begin to Pop Up in CD–ROMS, Games; Ads Begin in Video & Games and CD–ROM", Billboard, Mar. 25, 1995 pp. 58.
"DCI Telecommunications Inc. Announces Merger Discussion", PR Newswire, Mar. 15, 1996.
Hilzenrath, David S., "Change is Good, They Bet; Cybercash has the Product. Now if Only Nickel–And–Dime Transactions Would Take Off . . . " The Washington Post, p. F01, Oct. 21, 1996.
"Australian Interactive Television Could Include Gambling on Demand", Computergram International, May 2, 1996.

* cited by examiner

Primary Examiner—Mark Sager
(74) Attorney, Agent, or Firm—Dean P. Alderucci

(57) ABSTRACT

A network server provides control functions for gambling devices of the type which provide intermittent monetary payments to players at a point-of-play. The point-of-play includes an interactive display device for displaying messages to the player and for receiving player responses which are then transmitted to a network server. Memory at the network server stores product and product purchase information and customer profile data. The network server causes transmission of product and product purchase information to the interactive display device and monitors each of the gambling devices to detect an occurrence of a player win that requires a monetary payout. The network server is responsive to the detection of the player win and to an entry from the player which indicates the purchase of a product (as offered by a locally displayed advertisement), to credit the purchase price of the product against the anticipated monetary payout. The network server is also controlled to display selected subsets of product and product purchase information in accord with player characteristic data that is input by the player at the gambling device.

40 Claims, 7 Drawing Sheets

| NAME | SOCIAL SECURITY NUMBER | PLAYER ID NUMBER | ADDRESS | CREDIT CARD NUMBER |
|---|---|---|---|---|
| | | | | |
| | | | | |
| | | | | |

44

| CREDIT BALANCE | COMP. INFORMATION | HOTEL ROOM NUMBER | MERCHANDISE ID NUMBER | PLAYER STATUS NUMBER |
|---|---|---|---|---|
| | | | | |
| | | | | |
| | | | | |

FIG. 3

| MERCHANDISE ID NUMBER | PRICE | PRODUCT DESCRIPTION | QUANTITY REMAINING |
|---|---|---|---|
| | | | |
| | | | |
| | | | |

FIG. 4

| ADVERTISEMENT ID NUMBER | AUDIO / VIDEO OF ADVERTISEMENT | SLOT MACHINE CRITERIA | NUMBER OF TIMES DISPLAYED | NUMBER OF PURCHASES |
|---|---|---|---|---|
| | | | | |
| | | | | |
| | | | | |

FIG. 5

SLOT MACHINE ADVERTISING/SALES SYSTEM AND METHOD

This application is a continuation of U.S. patent application No. 08/769,085 filed Dec. 18, 1996 for "SLOT MACHINE ADVERTISING/SALES SYSTEM AND METHOD", which is used as U.S. Pat. No. 6,186,893 B1 on Feb. 13, 2001.

FIELD OF THE INVENTION

This invention relates to an apparatus which provides interactive marketing and user response facilities for gaming machines and, more particularly, to a system which selectively provides advertising and purchase information to a user in accordance with predetermined criteria such as player identification data and/or a gaming payoff amount.

BACKGROUND OF THE INVENTION

Slot machines provide an important source of income for the gaming industry. For that reason, gaming establishments constantly search for marketing strategies to appeal to slot machine players and to distinguish their slot machines from competitive installations. U.S. Pat. No. 5,259,613, en titled "Casino and Entertainment, System", describes a slot machine installation wherein gaming devices are provided with audio/video communication equipment that is connected to a central control station. The control station selectively engages in both voice and video communication with the players at each individual slot machine. Various promotions can be offered to the players through the video and audio communication facilities and live sporting events and even daytime soap opera television can be displayed.

It is well known that advertisers integrate advertising messages into video games. For instance, the billboards in some car-racing games are paid advertisements, in much the same manner as advertisers pay to have their messages displayed on billboards at a real race track.

Direct response advertising is well known and widely practiced. A direct response advertisement aims to elicit an order or inquiry upon the message being shown to a potential consumer. The response mechanism is often the return of a physical order coupon or the placing of a toll-free call to the direct response advertiser. Direct response advertising is now being attempted through electronic networks where the consumer can respond, electronically, from a computer terminal.

U.S. Pat. No. 5,488,411 entitled "Interactive System for a Closed Cable Network" provides an example of a prior art direct response advertising system. There, a closed cable network is described which includes means for transmitting and receiving telephone messages. As an example, the network is installed in a hotel and provides hotel guests with facilities for catalog shopping. Media information is fed to the guest's room via a television monitor. The guest can then select from a number of shopping sources by interacting with a catalog order desk which then bills the guest's room directly. The billing can occur through the hotel's account computer or can be charged to a credit card transaction. A receipt is then printed at the front desk of the hotel and the goods are delivered either to the hotel or the home address of the guest.

Modern slot machines are often networked, via a local area network, and are centrally controlled from a server (i.e., a computer operating under control of server software/firmware). Such a system is capable of handling any kind of digital information, both from the server to the individual slot machines and vice-versa. Since a slot machine has a coin acceptor, it is capable of receiving payment, measuring the amount of payment received and communicating such amount to the server. Many of the more modern slot machines display video reels instead of the well known mechanical reels. For slot-style gaming devices, such as video poker, video blackjack etc., the card faces are all video.

There is a continuing desire on the part of gaming establishments to increase the services that are provided to players at each gaming device. Further, there is a desire to provide such services, based upon intelligent conclusions regarding characteristics of the player and a matching thereof to offered products and services.

Accordingly, it is an object of this invention to provide a gaming system wherein advertising can be provided to slot-style gaming devices and which allows a player to respond to and benefit from such advertising messages.

It is a further object of this invention to provide a system for provision of advertising/product/pricing information to slot machine players, wherein the information is intelligently chosen based upon conditions at the slot machine and characteristics of the player.

SUMMARY OF THE INVENTION

A network server provides control functions for gambling devices of the type which provide intermittent monetary payments to players at a point-of-play. The point-of-play includes an interactive display device for displaying messages to the player and for receiving player responses which are then transmitted to a network server. Memory at the network server stores product and product purchase information as well as customer profile data. The network server causes transmission of product and product purchase information to the interactive display device and monitors each of the gambling devices to detect an occurrence of a player win that requires a monetary payout. The network server is responsive to the detection of the player win and to an entry from the player which indicates the purchase of a product (as offered by a locally displayed advertisement), to credit the purchase price of the product against the anticipated monetary payout. The network server is also controlled to display selected subsets of product and product purchase information in accord with player characteristic data that is input by the player at the gambling device.

BRIEF DESCRIPTION OF THE DRAWINGS

FIG. 3 is a schematic diagram of a player database maintained in the network server of FIG. 2.

FIG. 4 is a schematic diagram of a product database maintained in the network server of FIG. 2.

FIG. 5 is a schematic diagram of an advertising database maintained in the network server of FIG. 1.

DETAILED DESCRIPTION OF THE INVENTION

Figure 1:
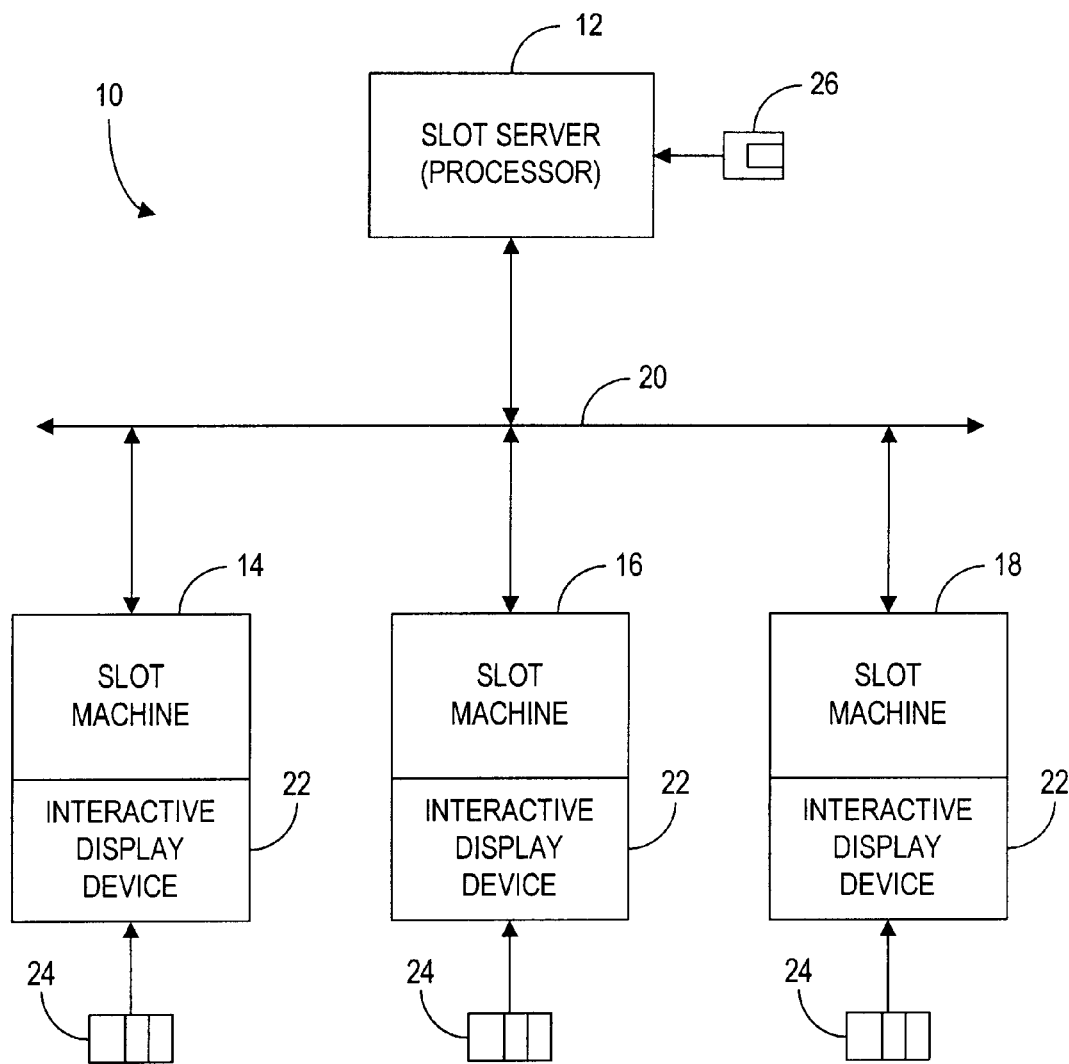
FIG. 1 is a block diagram of a network with a network server that cooperates with a plurality of slot machines to provide selected services thereto.

Referring to FIG. 1, a network 10 includes a network server 12 which is connected to a plurality of slot machines 14, 16, 18 . . . etc., via a bus system 20. Each of slot machines 14, 16, 18 includes an interactive display device 22 which is adapted to display messages that are either downloaded from network server 12 or are generated locally in the respective slot machine. The slot machines may alternatively be connected to server 12 through an appropriate wireless network.

Note that while only slot machines are indicated in FIG. 1 as being connected to bus system 20, other gaming devices which provide intermittent payouts to a player in response to continued play actions can also be controlled by network server 12 in the same manner as the slot machines (e.g., keno, bingo, poker, . . . etc.). Thus, while the description hereafter will consider slot machines, it is to be understood that other types of gaming devices are also to be considered within the scope of the invention.

Each interactive display device 22 is provided with means for receiving a player-identity card 24 that typically includes player information, e.g., identity of the player, and may also include further data such as an amount of a line of credit available to the player, an amount of remaining credit available, and player status information (i.e., frequent player, infrequent player, heavy bettor, . . . etc.). Each interactive display device 22 further includes key entry inputs (either soft or hard keys) that are made available for use by the player.

Network server 12 includes a transaction processor subroutine which is stored therein or which can be loaded thereinto via a magnetic disk 26. The transaction processor subroutine, in combination with the network server hardware, provides accounting and statistical services for connected slot machines, control and updating of connected databases, and provision of product and product purchase information to the slot machines. The transaction processor subroutine further processes input signals from the players at the respective slot machines.

Figure 2:
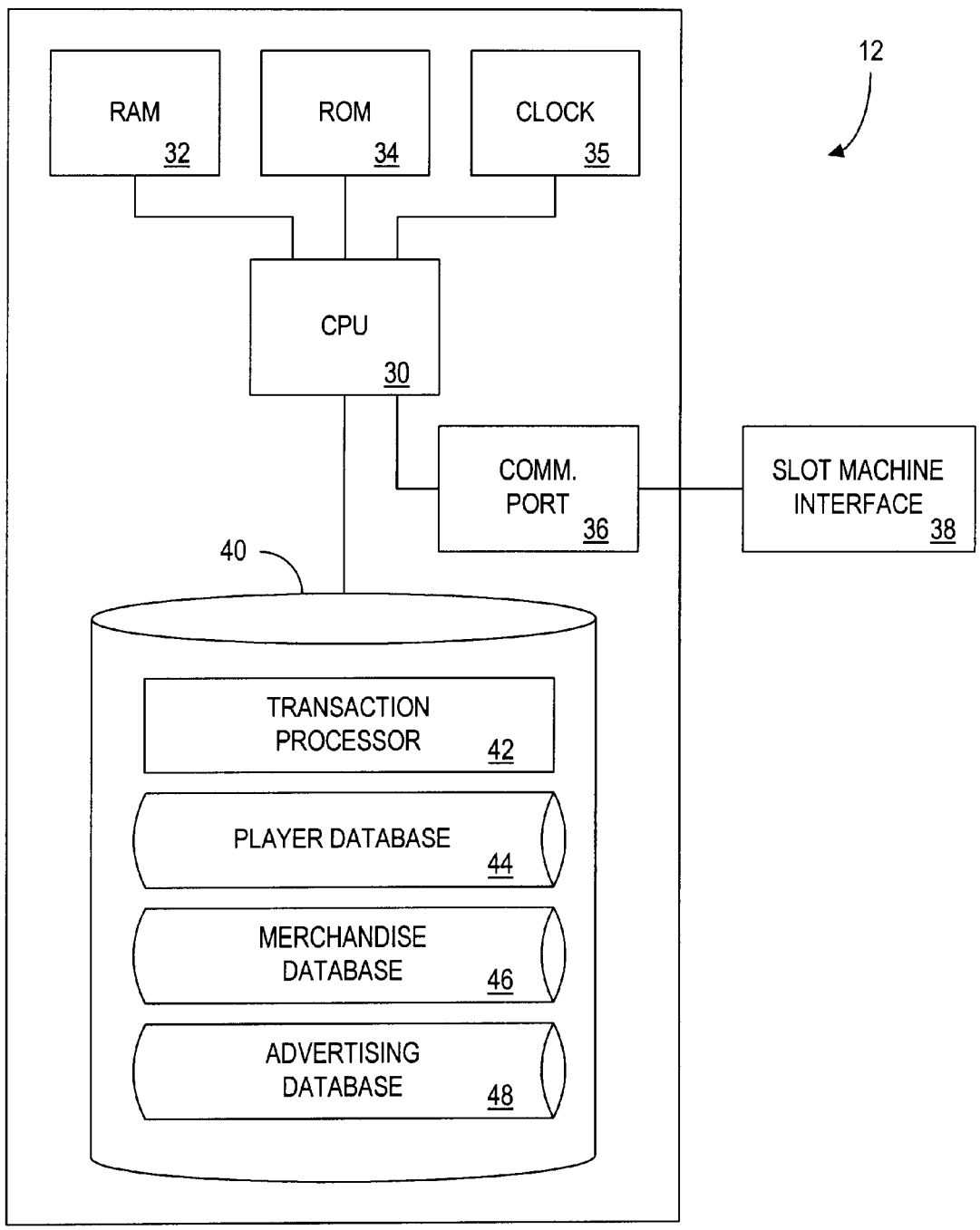
FIG. 2 is a high level block diagram of a network server which implements the invention hereof.

FIG. 2 illustrates a block diagram of a representative network server 12. Network server 12 includes a central processor unit (CPU) 30 which is coupled to a random access memory (RAM) 32, a read only memory (ROM) 34, a clock 35, and a communication port 36 which provides interconnection to bus system 20 (via slot machine interface 38). A data storage device 40 provides memory capacity for a transaction processor subroutine 42, a player database 44, a product database 46 and an advertising database 48. Note that while transaction processor subroutine 42 is indicated as a software driven process, it can also be performed by a dedicated microprocessor, to enhance system performance.

The operation of transaction processor subroutine 42 will be described in detail below in conjunction with the flow diagrams of FIGS. 7 and 8. A schematic showing of the contents of player database 44 is found in FIG. 3 and preferably includes the following data:

Name;
Social Security Number;
Player identification (ID) number;
Address;
Credit card number;
Credit balance;
Complimentary information;
Hotel room number;
Product ID number; and
Player status number.

Most of the contents of player database 44 is self-explanatory and requires no further description. The complimentary information is coded information indicating which services are to be provided to the player, free of charge or at a discount. The product ID number identifies product which the player has purchased, in a manner to be described below. Finally, the player status number is a value assigned to the player and indicates a status level assigned by the gaming establishment to the player. For instance, the player may be a frequent player and entitled to certain premiums. Further, the player may have been disqualified from further play and this will be indicated by an assigned status number.

In essence, player database 44 provides sufficient information to enable network server 12 to perform the invention hereof without requiring any further data from the player, other than a selection or non-selection of an offered product, service or offering.

Product database 46 is illustrated, schematically, in FIG. 4 and includes a product ID number; the price of the product; a brief product description; and the quantity of the product remaining. In addition to merchandise, database 46 may include services that are to be offered to players, e.g. tax advice, medical and legal consulting, etc. Further, for example, an offering may be included that will compensate the player for: switching phone services (i.e. AT&T to MCI), cable TV providers; from one credit card to another; taking out a loan from a specified institution; agreeing to attend a seminar, . . . etc.

The term "product" will be used hereafter to refer to all such offerings, i.e., merchandise-type products, services and other offerings.

Advertising database 48 is shown in FIG. 5 and includes an advertisement ID number; an audio/video presentation of the advertisement; a slot machine criteria code; number-of-times displayed indicator; and a number-of-purchases entry column.

The slot machine criteria entry in advertising database 48 is a code which identifies which set or subset of slot machines are to receive an advertisement. More specifically, certain advertisements will only be shown to slot machines which require, for example, a dollar or more for each play. Further, certain advertisements may only be shown to machines which are playable for less than a dollar per play. The number-of-times displayed and number-of-purchases entries in advertising database 48 are used for later analysis of the effectiveness of the advertisement.

While the audio/video presentation of the advertisement is shown as being contained within advertising database 48, a value inserted into database 48 may also be a pointer to a further on-line video or audio player that is responsive to the pointer and other control data to provide a desired presentation.

Figure 6:
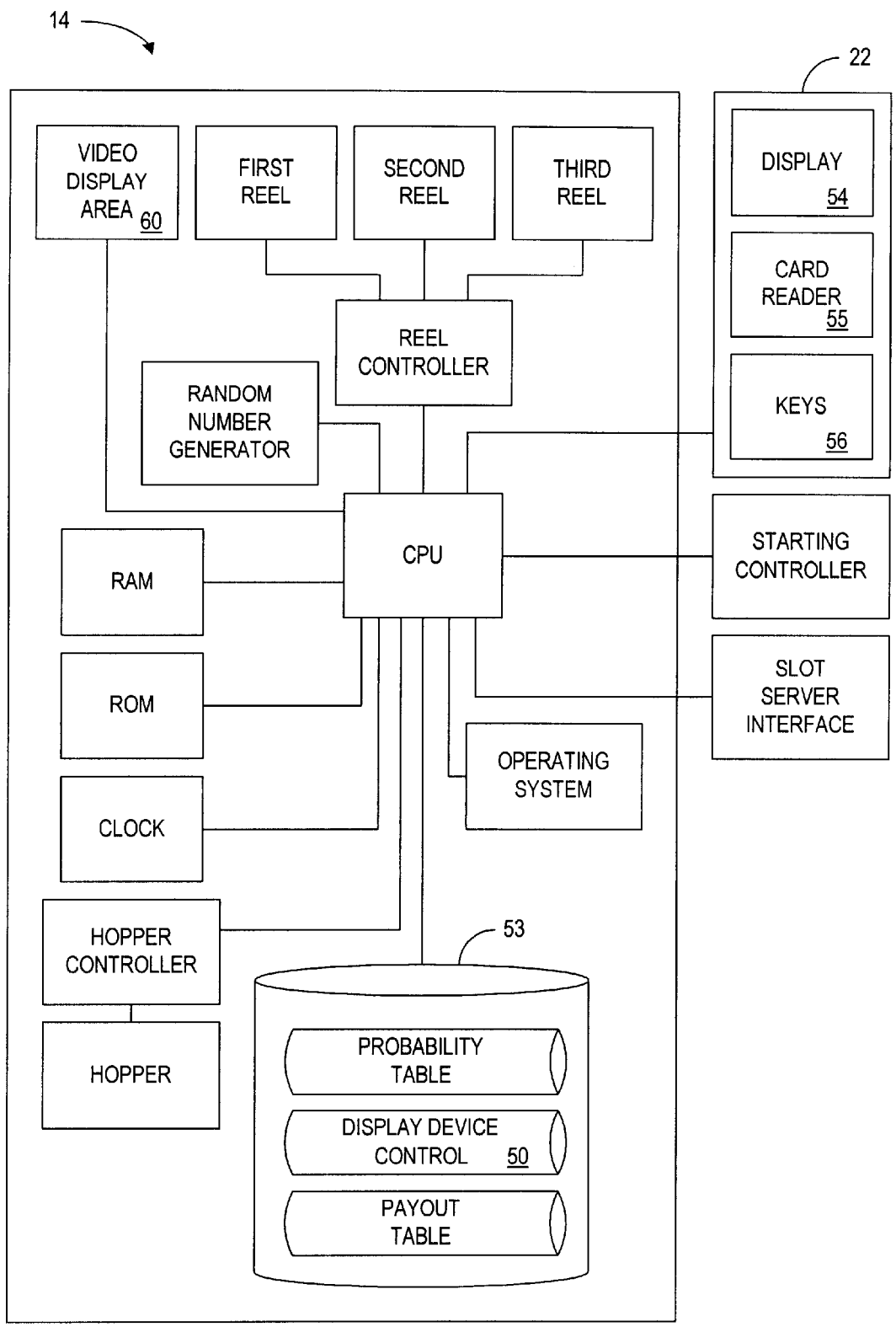
FIG. 6 is a high level block diagram of a slot machine employed in the network of FIG. 1.

Turning now to FIG. 6, a block diagram of a slot machine 14 is illustrated. Slot machine 14 is configured in a manner known in the prior art, except for the inclusion of an interactive display device 22 and a display device control subroutine 50 contained within a resident data storage device 53. Interactive display device 22 includes a display 54, a card reader 55 and keys 56 ("soft" or "hard") for enabling a player to input data into slot machine 14. A video display area 60 may also be present in slot machine 14, but may not be accessible to external control by network server 12. If this is the case, display 54 is used to display downloaded product/product purchase information and further messages to the player. Otherwise, the provision of display 54 may not be necessary. Each of the remaining submodules within slot machine 22 is known to those skilled in the art and requires no detailed discussion.

Display control subroutine 50 is called into action when a product/product purchase advertising message is received from network server 12 to enable display of the message by display 54. Further, display control procedure 50 controls the operation of interactive display module 22, including card reader 55 and keys 56. When a player inputs a selection or other data via keys 56, such an entry is recognized by display control procedure 50, which causes the resident CPU in slot machine 14 to configure the entered data for transmission over bus system 20 (via the slot/network server interface) to network server 12.

Figure 7:
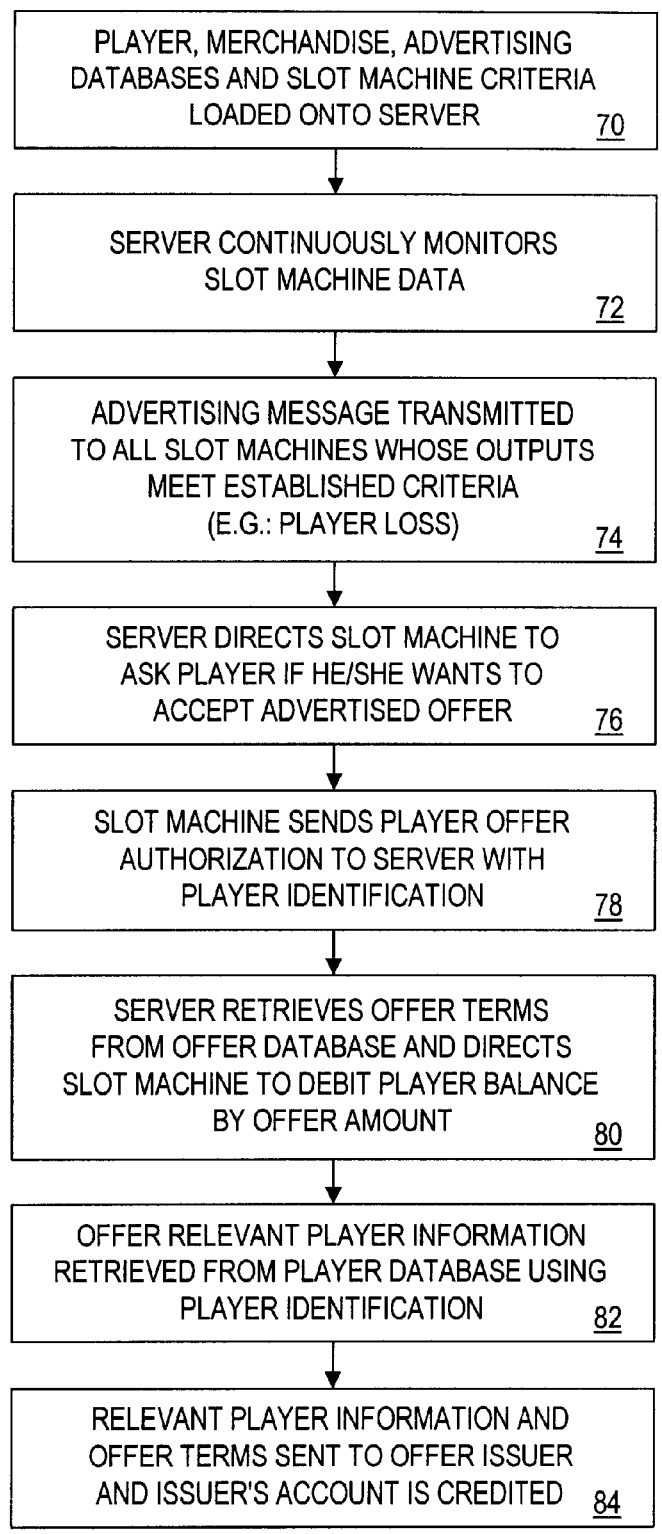
FIG. 7 illustrates a logic flow diagram of the operation of the invention.

Turning now to FIG. 7, the operation of the invention will be described. Initially, network server 12 has had loaded and stored therein player database 44, product database 46, advertising database 48 and slot machine criteria(box 70). Such stored databases and resident transaction processor routine 42 (FIG. 2) enable network server 12 to selectively provide advertising messages to individual slot machines 14, 16, 18 . . . .

Thereafter, network server 12 monitors and analyzes data that is fed from the connected slot machines (box 72). In response to the received slot machine data, network server 12 transmits product advertisement/pricing data to all slot machines whose output data meets established criteria (box 74). For instance, a certain product advertisement will be provided to all slot machines which require one dollar or more per play. Further, any slot machine which has been continuously played by a player for a predetermined period of time can be supplied with a subset of advertisements. Similarly, advertisements of certain price level products/services can be targeted to a player in accordance with the player's assigned status number. Such status number is input to the slot machine by insertion of the user's card into the card reader at the start of play.

In any event, an advertisement is transmitted to any slot machine which indicates to network server 12 that a player win has occurred which requires a monetary payout to the player. At such time, network server 12 will send a message to the respective slot machine which asks if the player wishes to purchase advertised goods for a displayed price (box 76). Such a message will appear on display 54 within interactive display module 22.

If the player sends a purchase confirmation to network server 12 (box 78), it is also preferably accompanied by a player ID number which is stored both locally in slot machine 22 and in network server 12. This will enable a confirming message to be transmitted to display 54 indicating the name of the purchaser, for confirmation purposes.

Thereafter, network server 12 retrieves the price of the product from product database 46 and directs slot machine 14 to pay out the amount of the win, less the purchase price of the product. If the purchase price is greater than the amount of the payout, the player's credit balance is debited by the amount of the purchase. Further, the credit balance maintained by network server 12 is likewise debited (box 80). Thereafter, the player address is retrieved from player database 44, based upon the player ID number (box 82). The player address and purchase information are then sent to a dispatching function where the goods are shipped to the player and network server 12 then credits the manufacturer's account with a payment amount (box 84).

The latter action assumes that the manufacturer's account is maintained locally. The system may also be configured to initiate a transfer of funds to the manufacturer's account in a banking establishment via a wire transfer.

If the player sends a purchase confirmation to network server 12 evidencing acceptance of a product "switch" offer (e.g., from one telephone supplier to another), server 12 retrieves the amount to be credited to the player, credits the player's account and so notifies the slot machine. If the account is also maintained at the slot machine, it too is credited. The credited amount may be tagged so that it is only useful for play of the slot machine, or it can actually be paid out, to be later billed to the player if the player reneges.

While not shown in FIG. 7, further control features can be implemented under control of transaction processor routine 42. For instance, the player, by agreeing to have an advertisement shown at his/her slot machine, can be targeted to enjoy incremental benefits such as higher payouts, free slot pulls, etc. Transaction processor routine 42 can also enable players to disable the advertising message, should they so desire. Further, a corporate sponsor can arrange for extra prizes to be available to be awarded to players with certain pre-specified status numbers in the player database (e.g., employees).

Finally, the product to be advertised at the time of a monetary payout can be chosen in conformance with the amount of the payout so as to enable the amount of the payout to at least cover the cost of the purchase.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A network server for providing control functions for connected gambling devices which provide intermittent monetary payments to players at a point of play, said point of play further including means for displaying messages to a player and means for receiving responses from said player which are transmitted to said network server, said network server comprising:

memory means for storing product and product purchase information;

processor means operating in conjunction with software control for
i) providing to said means for displaying, product information and product purchase information from said memory means;
ii) monitoring each of said gambling devices to detect an occurrence of a player win requiring a monetary payout to said player; and
iii) responding to detection of said player win and to an entry from said player indicating purchase of a product offered by said means for displaying, for crediting a purchase price of said product against said monetary payment.

2. The network server as recited in claim 1, wherein the player accepts a product switch offer and said processor means, in response to an indication that said player accepts the product switch offer, authorizes issuance of a payment to said player.

3. The network server as recited in claim 1, wherein said processor means, in response to indication of purchase of a product, authorizes issuance of said monetary payment to said player, less the purchase price of said product.

4. The network server as recited in claim 1, wherein said processor means selects product and purchase information for transmission to said means for displaying in accordance with an amount of said monetary payment.

5. The network server as recited in claim 1, wherein said processor means causes said means for displaying to display said product and product purchase information during play of said gambling device.

6. The network server as recited in claim 5, wherein said processor means causes a means for displaying associated with a specific gambling device to display a selected subset of product and product purchase information in response to receipt of data from said specific gambling device that a player fitting a determined criteria is playing said gambling device.

7. The network server as recited in claim 6, wherein said data from said specific gambling device is derived from a player-inserted identity card.

8. A method for enabling network server means to provide control functions for connected gambling devices which provide intermittent monetary payments to players at a point of play, said network server means including memory for storing product and product purchase information, said point of play further including means for displaying messages to a player and for receiving responses from said player which are transmitted to said network server means, said method comprising the steps of:
   a) providing to said means for displaying, product information and product purchase information from said memory;
   b) monitoring each of said gambling devices to detect an occurrence of a player win requiring a monetary payout to said player; and
   c) in response to detection of said player win and to an entry from said player indicating purchase of a product offered by said means for displaying, crediting a purchase price of said product against said monetary payment.

9. The method as recited in claim 8, wherein the player accepts a product switch offer, said method comprising the further step of:
   d) responding to an indication that said player accepts the product switch offer by authorizing issuance of a payment to said player.

10. The method as recited in claim 8, wherein step c) additionally authorizes a issuance of a monetary payment to said player that is less the purchase price of said product.

11. The method as recited in claim 8, wherein step a) further selects product and purchase information for transmission to said means for displaying in accordance with an amount of said monetary payment.

12. The method as recited in claim 8, wherein step a) further causes said means for displaying to display said product and product purchase information during play of said gambling device.

13. The method as recited in claim 12, wherein step a) further causes a means for displaying associated with a specific gambling device to display a selected subset of product and product purchase information in response to receipt of data from said specific gambling device that a player fitting a determined criteria is playing said gambling device.

14. The method as recited in claim 13, wherein said data from said specific gambling device is derived from a player inserted identity card.

15. A memory media for operation in conjunction with a network server to provide control functions for connected gambling devices which provide intermittent monetary payments to players at a point of play, said network server including memory for storing product and product purchase information, said point of play further including means for displaying messages to a player and for receiving responses from said player which are transmitted to said network server, said memory media comprising:
   a) means operating in conjunction with said network server for providing to said means for displaying, product information and product purchase information from said memory;
   b) means operating in conjunction with said network server for monitoring each of said gambling devices to detect an occurrence of a player win requiring a monetary payout to said player; and
   c) means operating in conjunction with said network server and responsive to detection of said player win and to an entry from said player indicating purchase of an offered product, for crediting a purchase price of said offered product against said monetary payment.

16. The memory media as recited in claim 15, wherein the player accepts a product switch offer and further comprising:
   d) means responsive to an indication that said player accepts the product switch offer, for authorizing issuance of a payment to said player.

17. The memory media as recited in claim 15, wherein means c) additionally causes said network server to authorize issuance of a monetary payment to said player that is less the purchase price of said offered product.

18. The memory media as recited in claim 15, wherein means a) additionally causes said network server to select product and purchase information for transmission to said means for displaying in accordance with an amount of said monetary payment.

19. The memory media as recited in claim 15, wherein means a) additionally causes said means for displaying to display said product and product purchase information during play of said gambling device.

20. The memory media as recited in claim 19, wherein means a) controls said network server to cause a means for displaying associated with a specific gambling device to display a selected subset of product and product purchase information associated with a determined criteria, in response to receipt of data from said specific gambling device that a player fitting said determined criteria is playing said gambling device.

21. A gambling device which provides intermittent monetary payments to players at a point of play further including means for displaying messages to a player and means for receiving responses from said player, said gambling device comprising:
   means for providing product information and product purchase information to a player;
   means for signaling an occurrence of a player win requiring a monetary payout to said player; and
   means responsive to said signaling of said player win and to an entry from said player indicating purchase of a product offered by said means for providing, for crediting a purchase price of said product against said monetary payment.

22. The gambling device as recited in claim 21, wherein the player accepts a product switch offer, further comprising:
   means responsive to an indication that said player accepts the product switch offer, for authorizing issuance of a payment to said player.

23. The gambling device as recited in claim 21, wherein said means responsive to said signalling responds to an indication of purchase of a product, by issuing a monetary payment to said player that is less the purchase price of said product.

24. The gambling device as recited in claim 21, wherein said means for providing displays product and purchase information in accordance with an amount of said monetary payment.

25. The gambling device as recited in claim 21, wherein said means for providing displays product and purchase information during play of said gambling device.

26. The gambling device as recited in claim 21, wherein said means for providing displays a selected subset of product and product purchase information in response to receipt of data that a player fitting a determined criteria is playing said gambling device.

27. The gambling device as recited in claim 26, wherein said data is derived from a player-inserted identity card.

28. A method for operating a gambling device which provides intermittent monetary payments to players at a point of play, said point of play further including means for displaying messages to a player and means for receiving responses from said player, said method comprising the steps of:

displaying product information and product purchase information to a player;

signaling an occurrence of a player win requiring a monetary payout to said player;

receiving an entry from said player indicating purchase of a displayed product; and responding to said signaling of said player win and to said entry, by crediting a purchase price of said product against said monetary payment.

29. The method as recited in claim 28, wherein the player accepts a product switch offer, said method comprising the further step of:

responding to an indication that said player accepts the product switch offer by issuing a payment to said player.

30. The method as recited in claim 28, wherein said responding step causes issuance of a monetary payment to said player that is less the purchase price of said product.

31. The method as recited in claim 28, wherein said displaying step displays product and purchase information in accordance with an amount of said monetary payment.

32. The method as recited in claim 28, wherein said displaying step displays a selected subset of product and product purchase information in response to receipt of data that a player fitting a determined criteria is playing said gambling device.

33. The method as recited in claim 32, wherein said data is derived from a player-inserted identity card.

34. A method for playing a gambling device which provides intermittent monetary payments to players at a point of play, said point of play further including means for displaying messages to a player and means for receiving responses from said player, said method comprising the steps of:

reviewing displayed product information and product purchase information at said gambling device, developing a credit balance usable at least for play of said gambling device;

evidencing a purchase of a displayed product; and receiving a monetary payout of said credit balance less a purchase price of said displayed product.

35. The method as recited in claim 34, wherein the player accepts a product switch offer, said method comprising the further step of:

responding to an indication that said player accepts the product switch offer by issuing a payment to said player.

36. The method as recited in claim 34, wherein said gambling device is a slot machine.

37. A gambling device which provides intermittent monetary payments to players at a point of play, said point of play further including means for displaying messages to a player and means for receiving responses from said player, said gambling device comprising:

a) means for providing product information and product purchase information to a player;

b) means for evidencing a credit balance for said player; and c) means responsive to an entry from said player indicating a purchase of a product offered by said means for providing, for crediting a predetermined amount to said credit balance.

38. The gambling device as recited in claim 37, wherein said product is a service offering.

39. The gambling device as recited in claim 38, wherein means c) causes issuance of a monetary payout in an amount of at least said predetermined amount.

40. A gambling device which provides intermittent monetary payments to players at a point of play, said point of play farther including means for displaying messages to a player and means for receiving responses from said player, said gambling device comprising:

a) means for providing product information and product purchase information to a player;

b) means for evidencing a credit balance for said player; and c) means responsive to an entry from said player indicating a purchase of a product offered by said means for providing, for debiting said credit balance by an amount of the purchase price of said product.

* * * * *